United States Patent [19]

Renaud-Goud

[11] Patent Number: 4,619,547
[45] Date of Patent: Oct. 28, 1986

[54] DEVICE FOR ASSEMBLING CONSTRUCTION ELEMENTS, NOTABLY CONSTRUCTION ELEMENTS MADE OF WOOD

[76] Inventor: Louis A. Renaud-Goud, Le Malod Avressieux, 73240 Saint Genix sur Guiers, France

[21] Appl. No.: 602,785

[22] Filed: Apr. 24, 1984

[30] Foreign Application Priority Data

Apr. 28, 1983 [FR] France ............... 83 07046

[51] Int. Cl.⁴ ............... F16B 7/04; F16B 12/44
[52] U.S. Cl. ............... 403/231; 403/246; 403/406.1
[58] Field of Search ............... 403/231, 230, 245, 246, 403/187, 199, 406, 407, 405, 255; 211/193; 248/245

[56] References Cited

U.S. PATENT DOCUMENTS

| 3,410,584 | 11/1968 | Bus | 403/230 |
| 3,458,052 | 7/1969 | Kann | 211/193 |
| 3,612,585 | 10/1971 | Mayr | 403/230 |
| 3,695,649 | 10/1972 | Lavergne | 403/231 |
| 3,778,175 | 12/1973 | Zimmer | 403/187 |
| 3,945,742 | 3/1976 | Condevaux | 403/255 |

FOREIGN PATENT DOCUMENTS 81874 1/1980 France .

Primary Examiner—Cornelius J. Husar
Assistant Examiner—Peter M. Cuomo
Attorney, Agent, or Firm—Beveridge, DeGrandi & Weilacher

[57] ABSTRACT

Device for assembling a first and a second construction element (4, 5) comprising a tie piece (15) fitted to slide in a recess (11) in the first construction element (4) and having at its end lying outside the said recess (11) at least one rib (18) projecting laterally and one pin (27) installed in a lateral recess (13) of the first element (4) and having an eccentric portion (31) entering a transverse passage (27) in the said tie piece (15), with the second element having a flange (50) that can be clamped between the end rib (18) of the said tie piece (15) and the wall of the said first element (4) when the said pin (27) is rotated in order to hold the said construction elements assembled.

Application of this assembly device to the construction of furniture.

10 Claims, 6 Drawing Figures

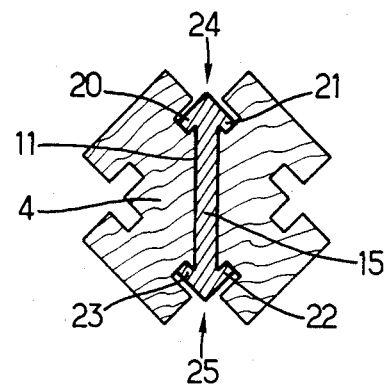
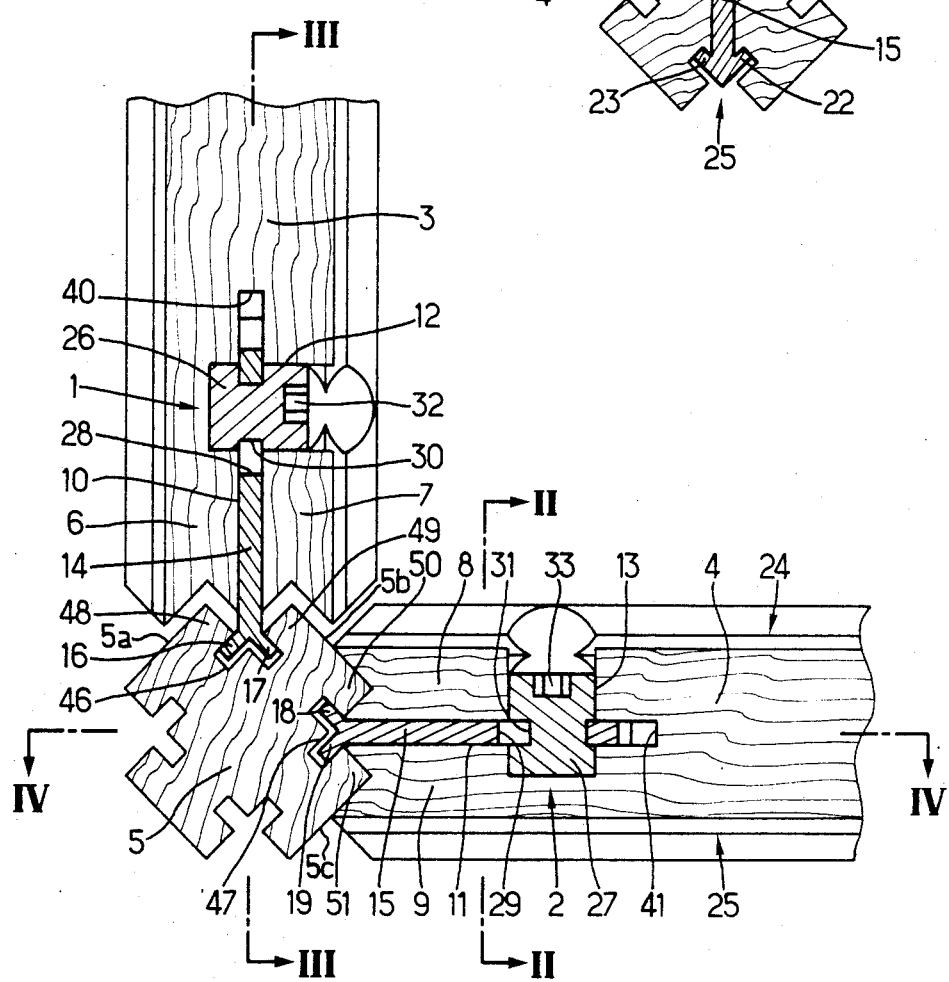

DEVICE FOR ASSEMBLING CONSTRUCTION ELEMENTS, NOTABLY CONSTRUCTION ELEMENTS MADE OF WOOD

The present invention relates to a device for assembling construction elements and notably wood construction elements for building furniture units like tables, cupboards or shelving.

At the present time the assembly devices used for fitting together two elements of a set of elements designed to form shelving, in particular, comprise two parts which are fixed most of the time by screws onto these two elements respectively. In use it turns out that these two parts do not stay firmly fixed to the two elements and that in the end these two elements tend to develop play between each other. In addition the assembly devices known at present require several operations to be performed during assembly.

The object of this invention is to remedy the drawbacks of the techniques being used at present for assembling construction elements and proposes a simple design of assembly device which requires few operations to install but still holds the two construction elements firmly together and allows their respective positions to be adjusted easily.

The device for assembling a first construction element and a second construction element consisting of a section, the object of the present invention, comprises firstly a tie piece having a portion forming a web designed to fit slidingly into a recess in the said first construction element and an end portion outside the said recess carrying two opposed ribs projecting laterally, with the said second construction element having a longitudinal groove bounding two longitudinal flanges capable of being placed between the ribs of the said tie piece and the wall of the said first element adjacent to the said recess, and secondly a pin designed to be placed in a lateral recess of the said first element running laterally to the said recess and having an eccentric portion which enters a transverse passage in the said portion forming the web of the said tie piece and capable of acting with the wall of this passage so as to move, by rotating the said pin in the said transverse recess, the said tie piece towards the inside of the said recess so as to pinch the said flanges of the said second element between the said ribs and the said wall of the said first element and thus hold the said construction elements assembled.

According to this invention the two lateral end ribs of the said tie piece form, with its web, a Y and the longitudinal groove of the said second element bounding the said flanges is V-shaped.

According to this invention the said longitudinal flanges of the said second element preferably form longitudinal ribs capable of entering the grooves of the said first element having a complementary shape. In a variant the said longitudinal flanges of the said second element form longitudinal ribs of V-shaped section which can enter the grooves of the said first element having a complementary shape. Thus, between the bearing surface of the said first element and the ribs of the said tie piece a substantial clamping effect is produced on the longitudinal flanges of the said second element.

According to this invention the said portion forming the web of the said tie rod may comprise at least one rib designed to be placed in one groove of the first element, with this groove and this rib running in the direction of movement of the said tie piece.

According to this invention the said portion forming the web of the said tie piece can be designed to be fitted into a longitudinal recess provided at the end of a section forming the said first element. In a variant the said portion of the said tie piece may comprise at least one rib designed to be placed in a longitudinal groove of the said section.

According to this invention the said tie piece may comprise at least one portion that is deformable elastically in its direction of movement and designed to bear against one wall of the said recess so as to push the said tie piece towards the outside of the said recess. In a variant, this elastically deformable portion may comprise at least one finger running roughly transversally and able to come and bear against the end wall of the said recess.

In a further embodiment the said pin may comprise two cylindrical portions connected by a smaller diameter eccentric cylindrical portion and the said transverse passage in the said tie piece may be designed to be cylindrical to take, on each side of the said longitudinal recess, the said cylindrical portions of the said pin, with the said transverse passage through the said tie piece having, in the latter's direction of movement, a portion projecting inwards and coming into contact with the eccentric portion of the said pin so that, by rotating the said pin, the said tie piece can be moved outwards from the said recess, whilst one of the cylindrical portions of the said pin has a longitudinal groove so that this grooved cylindrical portion can pass through the said cylindrical passage in the said tie piece to place the eccentric portion of the said pin inside this transverse passage. Thus, when the said pin is rotated in the transverse recess of the said first element the said tie piece can be moved in the recess in the first element in both directions.

According to this invention the eccentric portion of the said pin and the said passage in the said tie piece may respectively have at least one hollow portion and one protruding portion located on opposite sides of the said end ribs of the said tie piece; these portions are designed to enter each other in order to lock the said pin with respect to the tie piece.

The present invention also relates to a section designed to take the ribbed end of the tie piece of the above assembly device. This section is such that the said V-shaped longitudinal groove bounding the two longitudinal flanges of V cross-section is made at the vertex of two adjacent side faces of this section; the wall of one of the arms of the said V-shaped longitudinal groove facing the adjacent longitudinal flange lies in the continuation of the wall of the other longitudinal flange adjacent to its other arm. In another embodiment the arms of the said V-shaped longitudinal groove are parallel to the said adjacent flange.

According to this invention this section may comprise, at least at one of these ends, two arms bounding the said recess taking the web of the said tie piece, with the end of these arms each having a groove parallel to this recess of V-shaped cross-section, which is complementary to the V-shaped cross-section of the said longitudinal flanges.

This invention will be more clearly understood on studying assembly devices for construction elements which, in this case, are made of wood, described as non-restrictive examples and illustrated by the drawings in which:

FIG. 1 shows two identical assembly devices designed for fitting together two construction elements consisting of sections perpendicular to a third construction element also consisting of a section, one of them being in the assembly position and the other being in the assembled position, seen in section along the centre line of the first two sections;

FIG. 2 shows a cross section along II—II of one of the first two sections;

Figure 3:
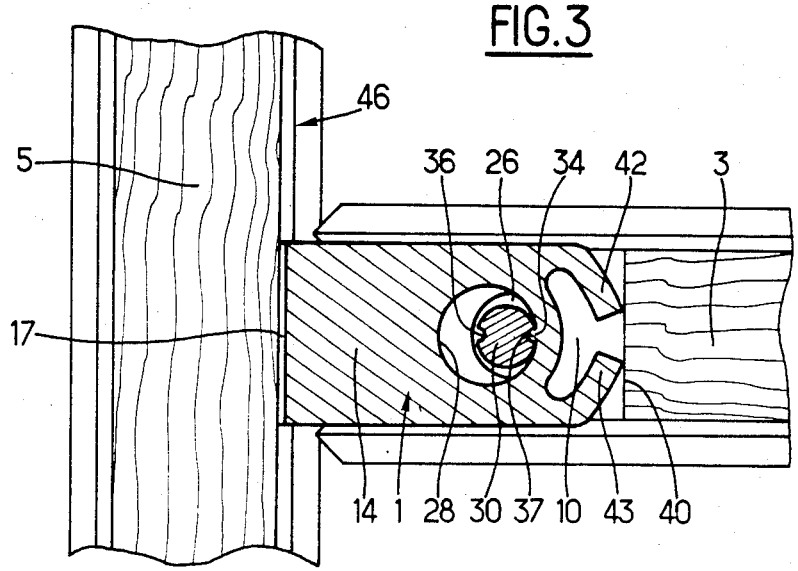
FIG. 3 shows an axial section along III—III of the section in the assembly position shown in FIG. 1.
Figure 4:
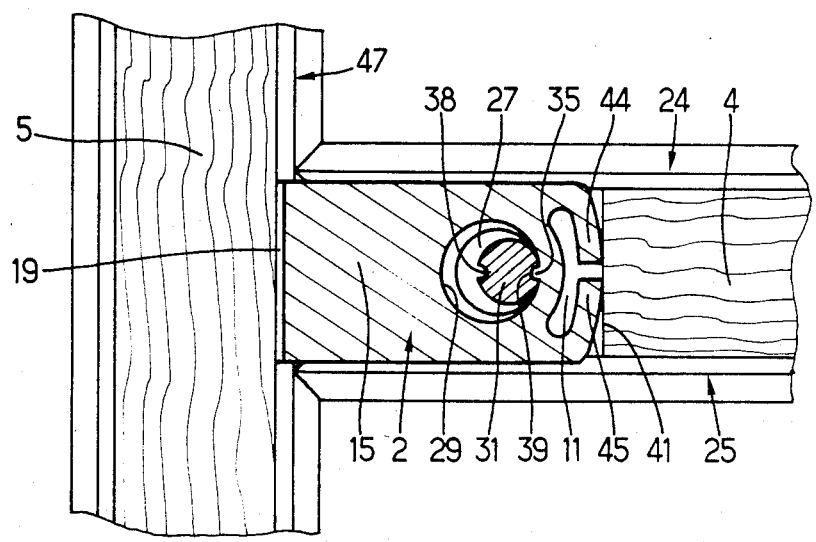
FIG. 4 shows an axial section along IV—IV of the section in the assembled position shown in FIG. 1.
Figure 5:
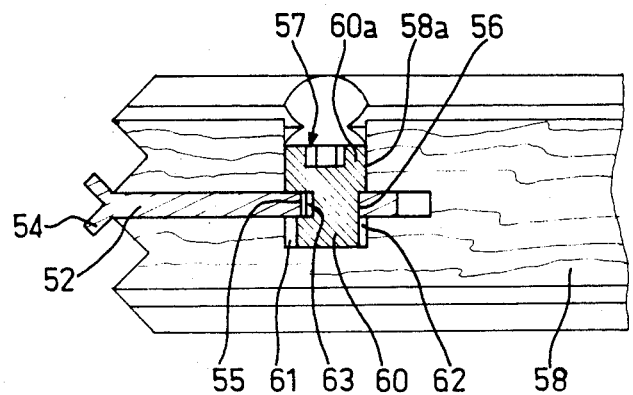
FIG. 5 shows a section view corresponding to FIGS. 1 and 2 of another assembly device.
Figure 6:
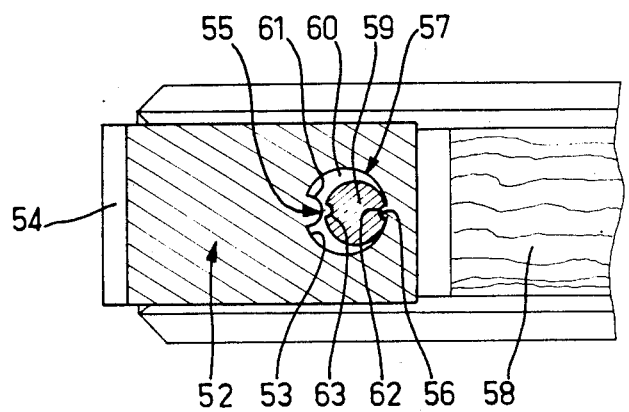

and FIG. 6 shows a section view corresponding to FIGS. 3 and 4 of the assembly device shown in FIG. 5.

Referring to FIG. 1 in particular, it can be seen that two assembly devices, marked overall by the reference numbers 1 and 2, have been shown; they are designed respectively for assembling two sections 3 and 4 to a third section 5, orthogonally, in order to make up at least in part the structure of a furniture unit such as a shelf unit.

The ends of the sections 3 and 4 respectively comprise two arms 6, 7 and 8, 9 which bound between them recesses 10 and 11 running axially and having two parallel axial faces.

Sections 3 and 4 also have respectively transverse cylindrical recesses 12 and 13 which pass through their arms 7 and 8 and which extend in part into their arms 6 and 9.

The assembly devices 1 and 2 respectively comprise tie pieces 14 and 15 the body or web of which has a rectangular cross-section and extends inside the recesses 10 and 11 in sections 3 and 4 between their arms 6, 7 and 8, 9

The ends of the tie pieces 14 and 15, outside the recesses 10 and 11, respectively have ribs 16, 17 and 18, 19 which run transversally to sections 3 and 4 and on either side so as to form Y's with the body of the tie pieces 14 and 15.

As can be seen in FIG. 2 the longitudinal edges of the body of the tie piece 15 respectively have longitudinal ribs 20, 21 and 22, 23 which run in longitudinal grooves marked overall by reference numbers 24 and 25, having complementary shapes, so that the tie piece 15 can be guided longitudinally to section 4. The tie piece 14 has ribs and section 3 has grooves in an equivalent manner.

In transverse recesses 12 and 13 in sections 3 and 4 cylindrical pins 26 and 27 are placed which run respectively through transverse cylindrical passages 28 and 29 in the body of tie pieces 14 and 15 and which have respectively eccentric cylindrical portions 30 and 31 running between two cylindrical portions and capable of bearing respectively against the wall of passages 28 and 29.

On the open side of recesses 12 and 13 of sections 3 and 4 the pins 26 and 27 have shaped recesses 32 and 33 which can take the end of a key so that they can be turned.

As can be seen in FIGS. 3 and 4 the passages 28 and 29 of the tie pieces 14 and 15 have, on the opposite side to the ribs 16, 17 and 18, 19, projections 34 and 35 and the eccentric portions 30 and 31 of the pins 26 and 27 have corresponding diametrically opposite hollow portions 36, 37 and 38, 39.

The tie pieces have, at their end portion next to the transverse ends 40 and 41 of recesses 10 and 11 in sections 3 and 4, respectively two fingers 42, 43 and 44, 45 which extend towards each other and which bear against the ends 40 and 41 of recesses 10 and 11 and which are elastically deformable in the direction of movement of the tie pieces 14 and 15 and which, owing to their elasticity, enable the tie pieces 14 and 15 to be moved outwards longitudinally to sections 3 and 4 so that the wall of passages 28 and 29 in tie pieces 14 and 15 is held in contact against the eccentric portions 30 and 31 of pins 26 and 27.

As can be seen in FIG. 1 in particular, section 5 has two V-shaped longitudinal grooves 46 and 47 which are complementary in shape to the ribbed ends of the tie pieces 14 and 15.

The groove 46 bounds two longitudinal flanges 48 and 49 which run between the end ribs 16 and 17 of the tie piece 14 and the end wall of section 3. Similarly the longitudinal groove 47 bounds two longitudinal flanges 50 and 51 which run between the end ribs 18 and 19 of the tie piece 15 and the end wall of section 5.

As can be seen in FIG. 1 the longitudinal flanges 48 and 49 and the longitudinal flanges 50 and 51 of section 5 form longitudinal ribs with a V-shaped cross-section which are able to enter the channels or ribs of complementary shape made in the ends of arms 6, 7 and 8, 9 of sections 3 and 4 parallel to recesses 10 and 11 and on either side.

Referring to FIG. 1, in particular, it can be seen that the longitudinal groove 46 of section 5 is made at the vertex of two perpendicular adjacent sides 5a and 5b of this section. The walls of the two arms forming the V-shaped longitudinal groove 46 are respectively parallel to these sides 5a and 5b whilst the wall of one of the arms of the V-shaped longitudinal groove 46 opposite the adjacent V-shaped cross-section longitudinal flange having its tip pointing towards the section and its vertex equal to 90°, lies in the continuation of the wall of the other longitudinal flange adjacent to its other arm. Thus the longitudinal groove 46 and the longitudinal flanges 48 and 49 can be produced by making two saw cuts, one being perpendicular to side 5a and the other perpendicular to side 5b of section 5. Clearly the longitudinal groove 47 formed at the vertex of adjacent sides 5b and 5c of section 5 and also the opposite longitudinal grooves 24 and 25 of section 4 and the corresponding grooves of section 3 are, in the example, produced in the same way; ribs 20, 21 and 22, 23 of tie piece 15 and the corresponding ribs of tie piece 14 run in these longitudinal grooves 24 and 25.

The assembly devices shown in FIGS. 1 to 4 and described above can be used in the following manner.

In order to fit the assembly device 2 onto the end of section 5 the body of the tie piece 15 is inserted into the recess 11 and its ribs 20, 21 and 22, 23 slid into the longitudinal grooves 24 and 25 of section 4. When the fingers 44 and 45 bear against the end 41 of recess 11 the tie piece 15 is pushed further into this recess and these fingers are deformed. When the passage 29 comes opposite the transverse recess 13, pin 27 is placed in this recess so that its eccentric portion 31 lies in this passage 29. The tie piece 15 is released and the wall of passage 29 in the tie piece 15 bears against this eccentric portion 31 because of the return force produced by the elastic fingers 44 and 45.

Assembly device 1 can be fitted on the end of section 3 in the same way.

It is then possible, by rotating pins 26 and 27, to place their eccentric portions 30 and 31 in such a position that the tie pieces 14 and 15, because of their elastic fingers 42, 43 and 44, 45, are in an extended position in which the assembly device 1 has been shown in FIGS. 1 and 3; the bosses 34 and 35 provided in the passages 28 and 29 of the tie pieces 14 and 15 then enter hollow recesses 37 and 38 in the eccentric portions 30 and 31 of pins 26 and 27 so as to lock these pins in this position.

The end ribs 16 and 17 and 18, 19 of the tie pieces 14 and 15 are then placed in the longitudinal ribs 46 and 47 of section 3 and these ribs are slid along until the sections 3 and 4 are placed in the required position longitudinally to section 5.

A key is used to rotate the pins 26 and 27 half a turn. This causes their eccentric portions 30 and 31 to move the tie pieces 14 and 15 into the recesses 10 and 11 in sections 3 and 4. When these pins have pivoted half a revolution the flanges 48 and 49 of section 5 are clamped between the end ribs 16 and 17 of the tie piece 14 and the end wall of section 3 and the flanges 50 and 51 of section 5 are clamped between the end ribs 18 and 19 of tie piece 15 and the end wall of section 4. The bosses 34 and 35 provided in the passages 28 and 29 in the tie pieces 14 and 15 are then in the recessed portions 36 and 39 of the eccentric portions 30 and 31 of the pins 26 and 27 so these pins are locked. The assembly devices are then in the position of assembly device 2 shown in FIGS. 1 and 4.

Sections 3 and 4 are thus assembled to section 5.

As can be seen in FIG. 1 the flanges 50 and 51 of section 5 which form the longitudinal ribs enter complementary grooves made in the end of section 4, thus preventing any rotational or lateral movement of sections 4 and 5 with respect to each other. The same is true for sections 3 and 5 in the assembled position.

When it is required to change the position of sections 3 and 4 with respect to section 5, or when it is required to dismantle these sections, all that is required is to reverse the operations; the elastic fingers 42, 43 and 44, 45 push the tie pieces 14 and 15 back out.

With reference to FIGS. 5 and 6, it can be seen that a different embodiment has been shown of the tie pieces and pins described previously. In this embodiment the tie piece marked overall with reference number 52 differs from tie pieces 1 and 2 described above in no longer comprising a return spring finger. A rib 55 which extends inwards on the side of the end 54 of the tie piece 52 carrying Y-shaped ribs and, diametrically opposite it, a rib 56 which also extends inwards are provided in its transverse cylindrical passage 53. The pin 57 associated with the tie rod 52 has, as in the previous examples, two cylindrical portions 60 and 60a contained in a cylindrical transverse recess 58a in the section 58 carrying it and these are connected by an eccentric cylindrical portion which runs through the passage 53 in the tie piece 52. Opposite its eccentric portion 59 the cylindrical portion 60 of the pin 57 which runs to the bottom of the transverse recess in the section 58 has a groove 61 with a shape complementing the rib 55 provided in passage 53. Opposite this groove 61 the eccentric portion 59 and the cylindrical portion 60 of pin 57 have a groove 62 the shape of which corresponds to the shape of the rib 56 provided in the passage 53. The eccentric portion 59 of the pin 57 also has a groove 63 diametrically opposite the rib 56 of passage 53.

Because of the rib 55 provided in the passage 53, which limits the movement of the eccentric portion 59 in the transverse passage 53, the movement of the tie piece 52 longitudinally to section 58 in one direction or the other can be provided by rotating the pin 57. The grooves 62 and 63 in the eccentric portion 59 can engage with the rib 56 provided in the passage 53 of the tie piece 52 so as to lock the pin 57 with respect to the tie piece 52 in its retracted position and in its extended position. As the cylindrical portion 60 of the pin 57 has its two grooves 61 and 62 this cylindrical portion 60 can pass through the passage 53 in the tie piece 52 so that the pin 57 can be installed when its grooves 61 and 62 are opposite the ribs 55 and 56 provided in the transverse passage 53 so that its eccentric portion 59 is placed in the transverse passage 53 and vice versa.

The present invention is not restricted to the examples described above. Many other embodiments both of the assembly device and of the construction elements being assembled are possible without lying outside the framework defined by the appended claims.

I claim:

1. A device for connecting a first construction element having a connecting end to a second construction element extending at right angles thereto, said first element having a longitudinal web-receiving recess at said connecting end and a lateral pin-receiving recess extending transversely to said web-receiving recess, said second element having two longitudinal flanges forming a longitudinal groove therebetween, said groove being V-shaped and being formed of two arms, said device comprising a tie piece having a web portion which is slidable in said web-receiving recess of the said first construction element, said tie piece having an end portion which is located outside the said web-receiving recess of the said first construction element, said end portion having two oppositely projecting lateral ribs which are received in the longitudinal groove of said second element, a pin which is receivable in the pin-receiving recess in the first element, said tie piece having a transvere passage formed therein, said pin running laterally to the web-receiving recess and having an eccentric portion entering said transverse passage in the web portion of the tie piece so that rotation of the pin in the transverse pin-receiving recess moves the tie piece into the said web-receiving recess to clamp the longitudinal flanges of the second element between the ribs of the tie piece and the end of the first element in order to hold the construction elements in assembled relation, the web and the two lateral ribs on the tie piece forming a Y, the longitudinal groove of the said second element being shaped complementary to the Y-shaped end portion of the tie piece, each of said longitudinal flanges of the second element forming longitudinal rib means adjacent to said V-shaped groove, each of said longitudinal rib means of the second element having two exposed faces which lie substantially parallel to the arms of said V-shaped groove, thereby providing the longitudinal rib means with an exposed V-shaped surface for entering complementary shaped grooves in the end of the first element adjacent to its longitudinal recess receiving the web of the tie piece.

2. The assembly device according to claim 1 wherein the web of the tie piece comprises at least one lateral, longitudinal tie piece rib (20) which is insertable in a longitudinal groove (24) of the first element, said longitudinal groove of the first element having the same shape as the said V-shaped groove of the second element.

3. The assembly device according to claim 1, wherein the first element has two arms (8,9) bounding the web-receiving recess, said web of the tie piece having at least one lateral, longitudinal rib (20) which is receivable in longitudinal groove (21) of the first element, said longitudinal groove of the first element having the same shape as the said Vshaped groove of the second element.

4. The assembly device according to claim 1 wherein the tie piece has at least one portion elastically deformable in the direction of its movement and operable to bear against a wall of the web-receiving recess to move the said tie piece outward from the web-receiving recess.

5. The assembly device according to claim 4 characterized in that the said elastically deformable portion of the tie piece comprises at least one transverse finger means for bearing against the end wall of the web-receiving recess.

6. The assembly device according to claim 1 wherein the pin comprises two cylindrical portions separated by a cylindrical eccentric portion, said transverse passage of the said tie piece being cylindrical so as to receive the cylindrical portions of the pin on each side of the web-receiving recess, said transverse passage of the tie piece having, in the direction of tie piece movement, an inwardly projecting portion which is engageable with the eccentric portion of the pin so that, by rotating the pin, the tie piece can be moved outward from the web-receiving recess, one of the cylindrical portions of the pin having a longitudinal groove (61) which permits this grooved cylindrical portion to pass through the transverse passage of the tie piece until the eccentric portion of the pin is located in this transverse passage.

7. The assembly device according to claim 1 wherein the eccentric portion of the pin and the transverse passage of the said tie piece have respectively at least one hollow portion and one projecting portion located on the side opposite to the said end ribs of the tie piece, with these hollow and projecting portions being shaped to enter each other in order to lock the pin rotationally with respect to the tie piece.

8. A device for connecting a first construction element to a second construction element, said first element having a web-receiving recess and a lateral pin-receiving recess said second element having a longitudinal groove bounding two longitudinal flanges, comprising, a tie piece having a web portion which is slidable in said web-receiving recess of the said first construction element, said tie piece having an end portion which is located outside said web-receiving recess and has two oppositely projecting lateral ribs which are received in the longitudinal groove of said second element, a pin which is receivable in the pin-receiving recess in the first element, said pin running laterally to the web-receiving recess and having an eccentric portion entering a transverse passage in the web portion of the tie piece whereby rotation of the pin in the transverse pin-receiving recess moves the tie piece into the said web-receiving recess to clamp the longitudinal flanges of the second element between the ribs of the tie piece and the first element in order to hold the construction elements in assembled relation, characterized in that the web and the two lateral ribs on the tie piece form a Y, and the longitudinal groove of said second element is V-shaped, said pin including two cylindrical portions separated by a cylindrical eccentric portion, said transverse passage of the said tie piece being cylindrical so as to receive the cylindrical portions of the pin on each side of the web-receiving recess, said transverse passage of the tie piece having, in the direction of tie piece movement, an inwardly projecting portion which is engageable with the eccentric portion of the pin so that, by rotating the pin, the tie piece can be moved outward from the web-receiving recess, one of the cylindrical portions of the pin having a longitudinal groove (61) which permits this grooved cylindrical portion to pass through the transverse passage of the tie piece until the eccentric portion of the pin is located in this transverse passage.

9. A device for connecting a first construction element having a connecting end to a second construction element extending at right angles thereto, said first element having a longitudinal web-receiving recess at said connecting end and a lateral pin-receiving recess extending transversely to said web-receiving recess, said second element having two longitudinal flanges forming a longitudinal groove therebetween, said device comprising a tie piece having a web portion which is slidable in said web-receiving recess of the said first construction element, said tie piece having an end portion which is located outside the said web-receiving recess, said end portion having two oppositely projecting lateral ribs which are received in the longitudinal groove of said second element, a pin which is receivable in the pin receiving recess in the first element, said tie piece having a transverse passage formed therein, said pin running laterally to the web-receiving recess and having an eccentric portion entering said transverse passage in the web portion of the tie piece so that rotation of the pin in the transverse pin-receiving recess moves the tie piece into the said web-receiving recess to clamp the longitudinal flanges of the second element between the ribs of the tie piece and the end of the first element in order to hold the construction elements in assembled relation, said pin comprising two cylindrical portions separated by a cylindrical eccentric portion, said transverse passage of the said tie piece being cylindrical so as to receive the cylindrical portions of the pin on each side of the web-receiving recess, said transverse passage of the tie piece having, in the direction of tie piece movement an inwardly projecting portion which is engageable with the eccentric portion of the pin so that, by rotating the pin, the tie piece can be moved outward from the web-receiving recess, one of the cylindrical portions of the pin having a longitudinal groove (61) which permits this grooved cylindrical portion to pass through the transverse passage of the tie piece until the eccentric portion of the pin is located in this transverse passage.

10. The assembly device according to claim 9 wherein the eccentric portion of the pin and the transverse passage of the said tie piece have respectively at least one hollow portion and one projecting portion located on the side opposite to the said end ribs of the tie piece, with these hollow and projecting portions being shaped to enter each other in order to lock the pin rotationally with respect to the tie piece.

* * * * *